United States Patent
Goorjian (10) Patent No.: US 9,774,395 B1
(45) Date of Patent: Sep. 26, 2017

(54) SPACE OPTICAL COMMUNICATIONS USING LASER BEAMS

(71) Applicant: The United States of America as Represented by the Administrator of the National Aeronautics & Space Administration (NASA), Washington, DC (US)

(72) Inventor: Peter M. Goorjian, Oakland, CA (US)

(73) Assignee: The United States of America as Represented by the Administrator of NASA, Washington, DC (US)

( * ) Notice: Subject to any disclaimer, the term of this patent is extended or adjusted under 35 U.S.C. 154(b) by 31 days.

(21) Appl. No.: 14/683,082

(22) Filed: Apr. 9, 2015

Related U.S. Application Data (60) Provisional application No. 61/986,589, filed on Apr. 30, 2014.

(51) Int. Cl.
 - *H04B 10/118* (2013.01)
 - *H04B 10/112* (2013.01)
 - *G01J 1/42* (2006.01)

(52) U.S. Cl.
 CPC ........ *H04B 10/1123* (2013.01); *G01J 1/4257* (2013.01); *H04B 10/118* (2013.01)

(58) Field of Classification Search
 CPC ... H04B 10/1123; H04B 10/118; G01J 1/4257
 See application file for complete search history.

(56) References Cited

U.S. PATENT DOCUMENTS

| 8,301,027 B2 | 10/2012 | Shaw et al. | |
|---|---|---|---|
| 2001/0043381 A1* | 11/2001 | Green | H04B 10/1123 398/126 |
| 2002/0089726 A1* | 7/2002 | He | H04B 10/1121 398/121 |
| 2002/0109884 A1* | 8/2002 | Presley | H04B 10/1125 398/121 |

(Continued)

OTHER PUBLICATIONS

Carson, Richard F. et al. "Compact VCSEL-based laser array communications systems for improved data performance in satellites." Nanophotonics and Macrophotonics for Space Environments VIII, Proc. of SPIE vol. 9226, 92260H, 2014 (11 pgs).

(Continued)

*Primary Examiner* — Leslie Pascal
(74) *Attorney, Agent, or Firm* — Christopher J. Menke; Robert M. Padilla; Mark P. Dvorscak (57) ABSTRACT

A system for communicating between an object in space and a ground station, between objects in space, or between ground stations, includes a telecentric lens. Photodetectors positioned upon a focal plane of the telecentric lens detect an inbound light beam, received from a source, that has passed through the telecentric lens to the focal plane. Lasers positioned upon the focal plane transmit light beams from the focal plane through the telecentric lens to an area that includes the source of the inbound light beam. A processor detect signals from individual photodetectors corresponding to light detected, and selectively signals individual lasers that are close to those photodetectors, resulting in a returning beam that arrives close to the source, and which carries encoded data.

20 Claims, 4 Drawing Sheets

(56) References Cited

U.S. PATENT DOCUMENTS

| | | | |
|---|---|---|---|
| 2004/0151504 A1* | 8/2004 | Triebes | H04B 10/1125 398/131 |
| 2007/0297805 A1 | 12/2007 | Rabinovich et al. | |
| 2008/0002981 A1* | 1/2008 | Valley | H04B 7/18521 398/121 |
| 2013/0223846 A1* | 8/2013 | Joseph | H04B 10/11 398/119 |

OTHER PUBLICATIONS

Rabinovich, et al., A Cat's Eye Multiple Quantum-Well Modulating Retro-Reflector, IEEE Photonics Technology Letters, Mar. 2003, 461-463, 15-3, IEEE.

Rabinovich, et al., Cat's eye quantum well modulating retro-reflectors for free-space optical communications, Proceedings of SPIE, Jul. 7, 2003, vol. 4975.

Giannopoulos, et al., Two-dimensional integration of a vertical-cavity surface-emitting laser and photodetectors for position sensing, Applied Optics, Sep. 2008, 4555-4559, 47-25, OSA Publishing.

Salas, et al., Modulating Retro-Reflectors: Technology, Link Budgets and Applications, Proceeds of the 63rd International Astronautical Congress, 2012, IAC-12, B4, 6B, 11, Naples, Italy.

\* cited by examiner

SPACE OPTICAL COMMUNICATIONS USING LASER BEAMS

CROSS-REFERENCE TO RELATED APPLICATION

This application claims the benefit of U.S. Provisional Application No. 61/986,589, filed Apr. 30, 2014. U.S. Provisional Application No. 61/986,589 is hereby incorporated by reference in its entirety.

ORIGIN OF INVENTION

The invention described herein was made, in part, in the performance of work under a NASA contract and by an employee of the United States Government and is subject to the provisions of 51 U.S.C. §20135(b) of the National Aeronautics and Space Act, Public Law 111-314, §3 (124 Stat. 3330, 51 U.S.C. Chapter 201), and may be manufactured and used by or for the Government for governmental purposes without the payment of any royalties thereon or therefore.

BACKGROUND OF INVENTION

Technical Field of the Invention

The present invention relates to communicating at long distances using lasers, and more particularly to using a telecentric lens and lasers for space based communication.

Description of the Prior Art

Modulating Retro-Reflectors are described in Salas et al, IAC-12.B4, 6B, 11, in which a high powered laser interrogator beam is directed from the ground to a satellite. Within the satellite, the beam is redirected back to ground using a corner cube reflector. On the satellite, the beam passes through multiple quantum well modulators, which can admit or block passage of the beam to encode a data signal onto the returning beam.

A similar system is described in U.S. Patent Publication 2007/0297805 to Rabinovich et al.

Integration of VCSEL lasers with photodetectors is described in Giannopoulos, et al., Two-dimensional integration of a vertical-cavity surface-emitting laser and photodetectors for position sensing, Applied Optics, Vol. 47, No. 25, September 2008, pp 4555-4559. A VCSEL is positioned in the center of a position sensor, and has photodetectors positioned about the VCSEL.

SUMMARY OF THE INVENTION

In accordance with an embodiment of the disclosure, a system for communicating over large distances comprises an optical device configured to receive light beams at a plurality of angles, and to output corresponding light beams upon a focal plane, the position of the light beams upon the plane corresponding to the angle of the beam received, and to transmit light beams from the focal plane, and to output the light beams at an angle corresponding to a position of the transmitted light beam upon the focal plane; a plurality of photodetectors positioned upon a focal plane of the lens to detect the received light beams upon the focal plane; and a plurality of lasers positioned upon the focal plane to transmit the light beams from the focal plane.

In a variation thereof, a processor is configured to detect a signal from individual ones of the plurality of photodetectors corresponding to light detected, and to selectively signal individual ones of the plurality of lasers, the selection corresponding to the individual ones of the photodetectors signaling, the signal operative to cause the selected lasers to transmit light encoding data.

In further variations thereof, individual ones of the plurality of lasers are VCSEL type lasers; the lens is a telecentric lens; the selection by the processor corresponding to the individual ones of the photodetectors signal corresponds to individual ones of the plurality of photodetectors that are physically close to the selected individual ones of the plurality of lasers; processor is configured to execute software stored on non-transitory media, the software configured to signal a plurality of lasers to emit light including data, the emitted data multiplexed to form a common data stream; the multiplexing is wavelength division multiplexing; the data is encoded at a rate of more than about 1 GHz; the system is physically connected to a satellite; and/or there are two systems, one connected to a satellite at LEO, and one connected to a satellite at GEO, the systems operative to transmit and receive encoded data from each other.

In additional variations thereof, there are a plurality of systems disposed upon different astronomical objects/ground stations, the systems configured to transmit and receive encoded data from each other; the photodetectors and the lasers are manufactured together upon a wafer; there are more than 100 photodetectors, and more than 100 lasers; there are a plurality of systems physically connected to a satellite, and wherein when a source of received light is detectable by one system, light is receivable by at least one system regardless of a physical orientation of the satellite.

In another embodiment of the disclosure, a system for communicating between an object in space and an astronomical object, between objects in space, or between astronomical objects, comprises a telecentric lens; a plurality of photodetectors positioned upon a focal plane of the telecentric lens to detect an inbound light beam, received from a source, that has passed through the telecentric lens to the focal plane of the telecentric lens; and a plurality of lasers positioned upon the focal plane to transmit light beams from the focal plane through the telecentric lens to an area that includes the source of the inbound light beam.

In a variation thereof, the system further includes a processor configured to detect a signal from individual ones of the plurality of photodetectors corresponding to light detected, and to selectively signal individual ones of the plurality of lasers, the selection corresponding to the individual ones of the photodetectors signaling, the signal operative to cause the selected lasers to transmit light encoding data.

In further variations thereof, the individual ones of the plurality of lasers are VCSEL type lasers; and/or the data is encoded by at least one of switching on and off or modulating the laser beam of the selectively signaled individual ones of the plurality of lasers, at a frequency greater than 100 MHz.

In a yet further embodiment of the disclosure, a method for communicating between an object in space and an astronomical object, between objects in space, or between astronomical objects, comprises receiving one or more light beams through a telecentric lens, the light entering the lens at a first angle on first side of the telecentric lens; detecting the one or more received light beams using a plurality of photodetectors positioned upon a focal plane of the telecentric lens on a second side of the telecentric lens; transmitting one or more laser beams from individual ones of a plurality of lasers positioned upon the focal plane through the telecentric lens from the second side to the first side, and to an area that includes the source of the received one or more light beams; and using an electronic processor to encode data onto the one or more laser beams transmitted.

In a variation thereof, individual ones of the plurality of lasers are less than about 10 micrometers in diameter, and can be switched to encode data at frequencies greater than 100 MHz.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION OF THE INVENTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The figures herein are drawn for ease of understanding, and are not drawn to scale or proportion.

The disclosure provides a system and method for improving communications over long distances, for example from astronomical objects to an object in orbit, between objects in various orbits, and between astronomical objects. In particular, communication is improved using optical communications in space, including for example communications from the Earth to spacecraft in Earth orbit, or objects in deep space, such as at the moon and Mars, and between objects in Low Earth Orbit (LEO) and objects at a Geosynchronous Orbit (GEO), or a Geostationary Earth Orbit, which can be at a relatively much higher altitude than LEO.

Figure 1:
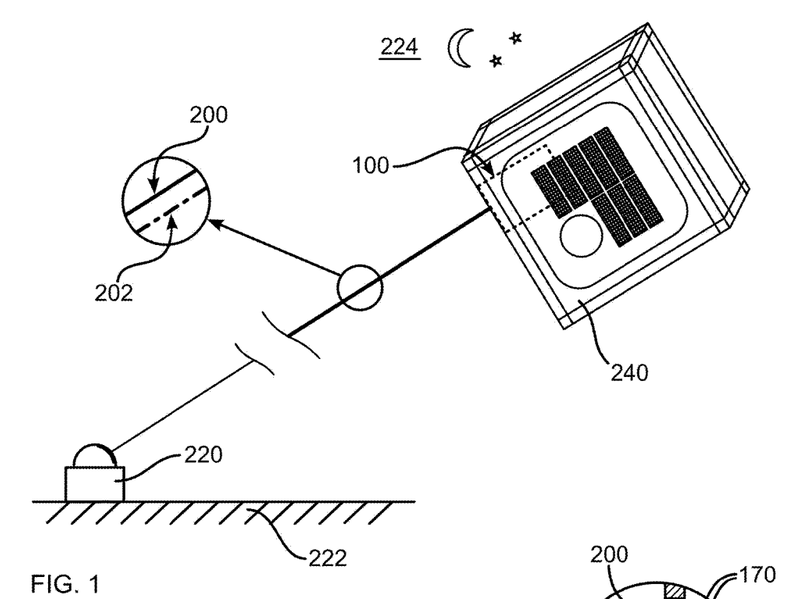
FIG. 1 depicts a satellite incorporating a system 100 of the disclosure, for communicating using laser beams sent from the Earth, and from the satellite, in accordance with the disclosure.
Figure 2:
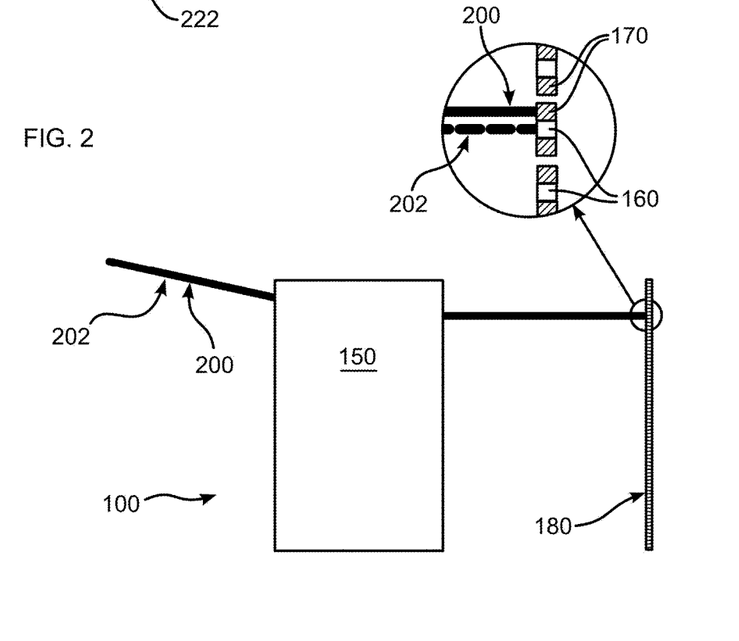
FIG. 2 depicts a schematic view of a beam of light passing from a source through a telecentric lens, and from a laser positioned on a focal plane of the lens passing through the lens and to the source, in accordance with the disclosure.

The disclosure includes a laser beam pointing technology that can be advantageously used aboard spacecraft with very limited amounts of available energy and physical space. With reference to FIGS. 1-2, a system 100 can detect a signal laser beam 200 and can then return a modulated laser beam 202 to the source, for example to a ground terminal 220 on the Earth 222, or to a satellite 240, or other object at a great distance in space 224. System 100 can replace methods that use either a laser together with a Pointing, Acquisition and Tracking (PAT) procedure which repositions a spacecraft, or a powerful ground-based laser cooperative with a retro-reflector in the spacecraft.

In FIG. 1, system 100 is mounted upon or within a satellite 240. In the example shown, a CubeSat is illustrated, although any form of object in space can be considered in the context of the example. Notwithstanding the foregoing, given that 1 U, 2 U, and 3 U CubeSats displace only one, two, and three liter(s) respectively, the system 100 can have a small size, and use a very small amount of energy, as discussed elsewhere herein.

Figure 3:
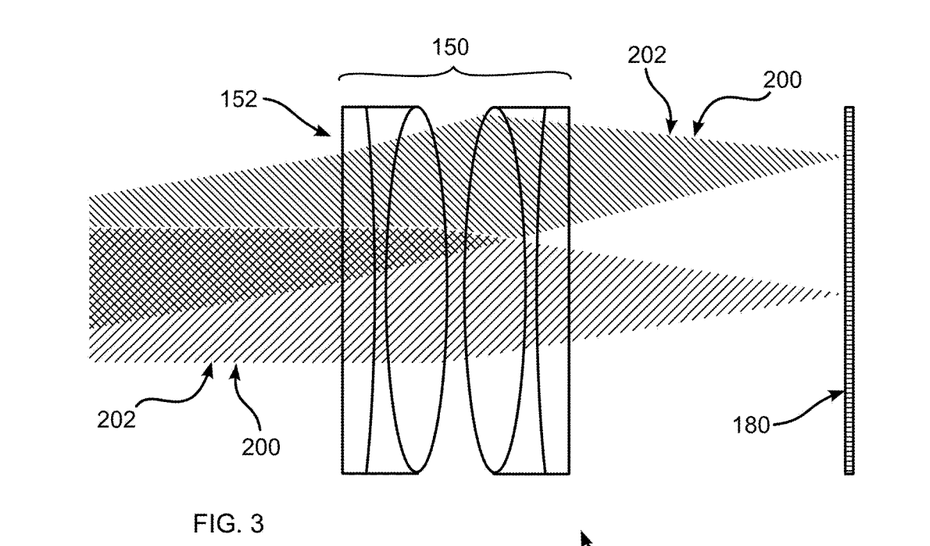
FIG. 3 depicts an embodiment of a telecentric optical device formed from lenses, incorporated within a system 100 of the disclosure, further illustrating beam paths through the lens.
Figure 4:
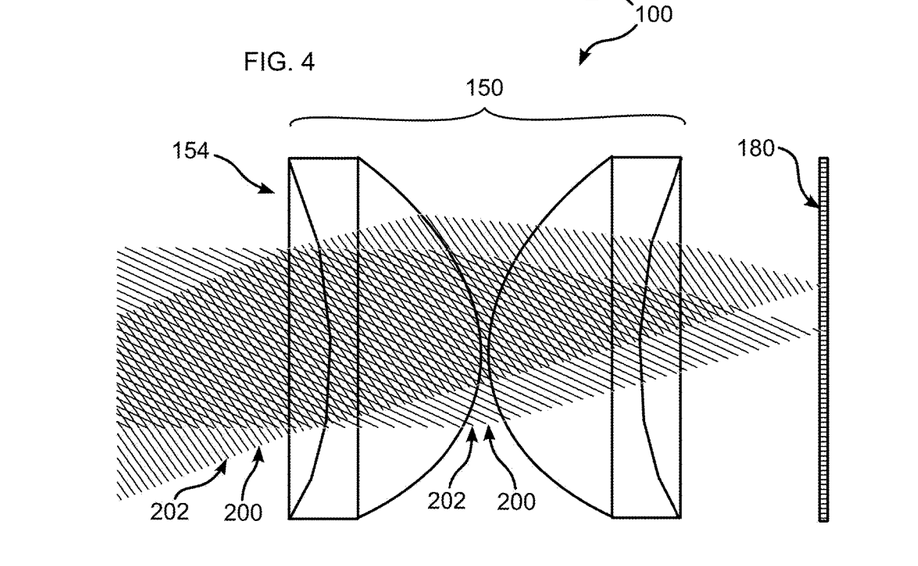
FIG. 4 depicts an alternative lens configuration within an optical device of the disclosure.

System 100 is illustrated in greater detail in FIG. 2, wherein a solid line diagrammatically represents a locking beam 200 generated by an interrogating source laser, and a data beam 202, respectively, returned from system 100 through optical device 150. As described elsewhere herein, it should be understood that locking beam 200 can additionally encode transmitted data. The rays are adjacent due to properties of optical device 150 which causes retro-reflection of an incoming beam 200 by producing, over the effective Field of View (FOV) of device 150, a symmetric ray bundle in the focal plane regardless of the input angle of the beam. In accordance with the disclosure, this can be accomplished by any known or hereinafter developed means. In an embodiment, device 150 is a telecentric cat's eye lens as shown and described, for example, in U.S. Patent Publication 2007/0297805 to Rabinovich et al., or in Rabinovich et al., IEEE Photonics Technology Letters, Vol. 15, No. 3, March 2003, the contents of each of which are incorporated herein by reference. The cat's eye telecentric lens of these references, most essentially, functions like a cats-eye lens in that it reflects light back in the angular direction from which it came, but instead of using a hemispherical mirror, a planar mirror is used. In an embodiment the telecentric lens is a double telecentric lens, as shown in FIGS. 3-4.

Figure 5:
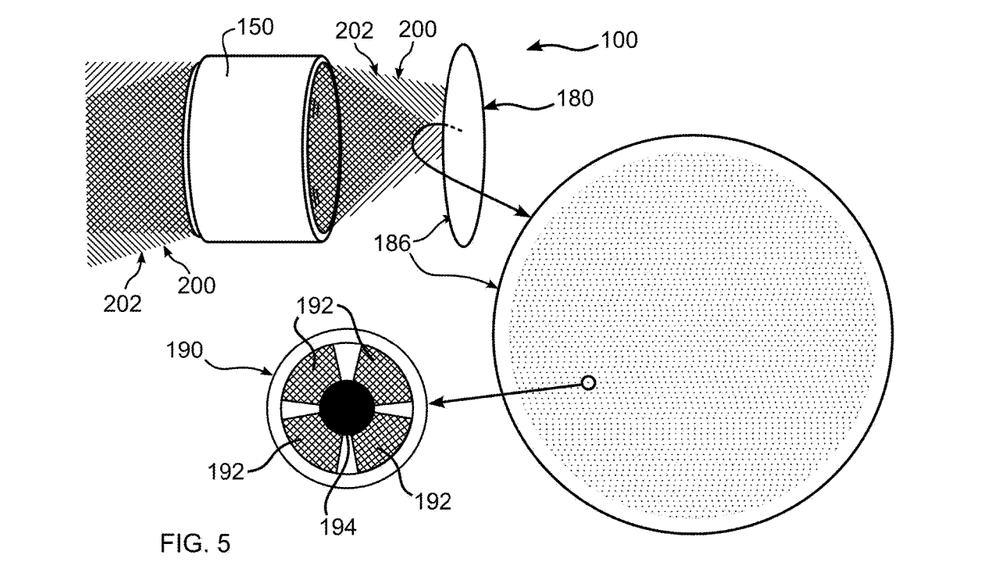
FIG. 5 depicts a perspective view of a system 100 of the disclosure, and a detail of a panel positioned along the focal plane of a telecentric lens of the system, and a further detail of a photodetector and lens subassembly located among many other such subassemblies upon the panel.

The instant invention exploits the ability of this type of telecentric lens, or any other device with these properties, of being able to return inbound light at the angle from which it was received, by reflection from a planar surface. More particularly, in accordance with the disclosure, one or more photodetectors 192 are associated with one or more lasers 194, or other source of collimated light (hereinafter laser), which can be electrically triggered in response to light detected by the photodetector 192, as shown in FIG. 5. The photodetector and associated laser are positioned upon a plane 180 defined by the focal plane of device 150.

When inbound light strikes the photodetector, an electrical signal of the photodetector causes generation of an outbound beam of light by laser 194. In an embodiment, an electronic device, for example a computer processor 1105, receives the electrical signal from the photodetector and accordingly sends a modulated or data encoded signal to laser 194, which produces a modulated or data encoded beam which is transmitted back through device 150 at the inbound angle, to an area that includes the original source of the inbound beam. It is advantageous for the outbound beam to be collimated, so that the beam will have sufficient concentration and strength to be detectable after traveling a large distance, for example between a device in orbit or space and a device on a planetary body, between orbiting devices or devices in space, or between devices upon different astronomical objects/ground stations.

It is a property of device 150 that beams entering device 150 orthogonal to the focal plane and plane 180 will be directed to the center of the focal plane, and therefore to a center of plane 180. As light enters device 150 at an angle offset with respect to an angle orthogonal to the focal plane, such light will be directed to a position on plane 180 that is relatively more offset from a center of the focal plane and plane 180 as the angle increases. In accordance with the disclosure, light generated at such an offset location is caused to leave device 150 at an angle corresponding to the angle of this inbound light. In this manner, the disclosure can function like a cats-eye telecentric lens.

FIGS. 3 and 4 illustrate alternative embodiments of optical device 150, each including an assembly of optical lenses. In FIG. 3, optical device 150 includes a lens assembly 152, such as is shown and described in U.S. Patent Publication 2007/0297805 to Rabinovich, et al., the contents of which are incorporated herein by reference. Two inbound/outbound examples of beams 200, 202 are illustrated, demonstrating that beams orthogonal to plane 180, within the lower shaded example area, will be directed to the center of the focal plane 180, and beams entering at an angle, within the upper shaded example area, will be directed to a position offset from the center of the focal plane 180. Likewise, due to the properties of optical device 150, light leaving from the center of plane 180, generated by a laser 194, will leave optical device 150 orthogonal to plane 180, and light leaving from offset from the center of plane 180, generated by a different laser 194, will leave optical device 150 at an angle corresponding to the distance the laser 194 is offset from a center of the focal plane 180. FIG. 4 illustrates the same principle, but using a lens assembly 154 such as is as shown and described in Rabinovich, et al., Free-Space Laser Communication Technologies XV, G. Stephen Mecherle, Editor, Proceedings of SPIE Vol. 4975 (2003), the contents of which is incorporated by reference herein.

In an embodiment, a laser 194 is associated with one or more photodetectors 192, and a field of such laser/photodetectors combinations is distributed across the focal plane of device 150 upon plane 180. To provide a sufficiently small laser source, a vertical-cavity surface-emitting laser (VCSEL) can be used, for example. These can be low power, for example about 1 mW, or high power, for example about 1 W, and are currently available up to 5 W, or in arrays which can be in the range of a kilowatt or more. These can be assembled together with photodetectors, ideally a VCSEL and its associate photodetector are in close proximity, so that the outbound beam produced by the VCSEL arrives at the location of the inbound beam, at a location of a detector proximate the source of the inbound beam 200. A subassembly of a laser 194 and associated photodetectors 192, which are manufactured in arrays, is shown and described, for example, in Giannopoulos et al, Applied Optics, Vol. 47, No. 25, September 2008, pp 4555-4559, the contents of which are incorporated herein by reference.

With reference to FIG. 5, a detector/laser panel 186 includes numerous detector/laser subassemblies 190, for example of the type described in Giannopoulos, or as may hereafter be developed. In an embodiment, the photodetectors 192 are PIN photodetectors, although other types can be used, including for example MSM or RCPD types, or other known or hereinafter developed type of photodetector. A laser 194 is positioned proximate the photodetectors 192, in the example shown, in a center surrounded by four photodetectors 192. It should be understood that there may be any number of lasers 194 proximate any number of photodetectors 192, and that such combinations can operate together, the one or more lasers 194 emitting in response to one or more of the photodetectors 192 detecting inbound light. Alternatively, a computer processor 1105 can associate detectors 192 and laser 194 by executing software which selects combinations advantageous to a particular application. Other configurations are illustrated in Giannopoulos, and may exist or be hereafter developed.

In an embodiment, there are thousands of detector/laser subassemblies 190 positioned upon the focal plane 180, each connected to an electronic processor 1105. A determination of the quantity of subassemblies, and their distribution upon plane 180, is dependent upon a particular application of the disclosure, and is based upon beam strength, a distance between systems 100, available power and space, cost, and other factors. In an embodiment, subassemblies are manufactured as an integrated wafer. In an embodiment, a VCSEL has a diameter of five micrometer, and photodetectors are currently available at a similar size, enabling a subassembly 190 that is quite small relative to the range of apertures of optical device 150. It should be understood that larger lasers can be used.

In an embodiment, not shown, one or more subassemblies 190 are moveable upon plane 180. In this manner, a single subassembly 190 can be used, or a lesser number of subassemblies 190. Movement can based upon instructions from a processor 1105, and can be carried out by any of electro-mechanical means, shape memory alloys, or any other known or hereinafter developed means. Alternatively, plane 180 can be moved.

The diameter of the lens of optical device 150 can be, for example, 10 cm. Device 150 can have a substantially smaller lens diameter, for example less than a centimeter, or substantially larger than 10 cm, for example 40 centimeters or more. A size of device 150 is determined in part by an intended use, and may be limited by factors such as weight, cost, and energy requirements. The size of panel 186 corresponds to the lens design of device 150.

VCSELs can be highly energy efficient, and can operate, for example, in the milliwatt range, making them advantageous for satellites and other vessels operating within a very limited energy budget. Lasers with higher energy requirements, and which can generate a stronger signal, can be positioned upon an astronomical object, such as the Earth or its moon, where greater energy, weight, and dimensional resources may be available. Similarly, more sensitive instruments can be made available for reliably detecting the light emitted from a single VCSEL. Further, VCSELs can advantageously be operated at a wavelength of 1,550 nanometers, which is deemed safe for human eyes within the power ranges needed for light based communications in accordance with the disclosure. Additionally, equipment for detecting and transmitting light at 1,550 nanometers currently exists, facilitating implementation of the disclosure. In an embodiment, the light emitted from a single laser 194 element is 10 to the $8^{th}$ power greater than the inbound beam. In a further embodiment, multiple lasers 194 can be illuminated simultaneously to increase the strength of an outbound beam.

In some applications, an inbound beam may have diverged, or may otherwise illuminate a plurality of photodetectors 192.

In one exemplary use, a signal in the form of an inbound beam of light, typically collimated light, is directed towards system 100 with sufficient precision to enter device 150, wherein symmetrical or parallel ray bundles are directed to the focal plane 180 and panel 186. One or more photodetectors 192 detect the inbound light, and signal to an electronic processor 1105 to activate one or more associated lasers 194 to generate an output beam which is caused to leave optical device 150 at the same angle as the inbound beam of light. Accordingly, the outbound beam of light can be detected at the location of the source of the inbound beam of light. The processor can modulate the one or more lasers 194 to encode data by switching lasers 194 on and off at a desired frequency. This pattern of on and off can be detected at the destination, and the encoded data can thereby be obtained. VCSELs are currently capable of switching on and off at a rate of substantially more than 1 gigahertz, thereby enabling the transmission of relatively larger amounts of data than is possible using other devices and methods. It should be understood that lower frequencies can be used, for example of 100 MHz or less, or between 100 MHz and 1 GHz, to conserve power or for any other reason, and can receive or transmit at any other frequency that may be useful, for example to communicate with systems not capable of higher frequencies. It should further be understood that lasers can be used in accordance with the disclosure that have not yet been produced, and which can switch at data rates far higher than 1 GHz.

It is typical for a projected beam to be caused to jitter or waver due to vibration or movement of any or all of the structure supporting the source of the beam, interference experienced by the beam between its source and destination, for example in the atmosphere, and movement of the destination structure. As such, using prior art methods, lasers at the space terminals must be pointed extremely accurately at the ground terminal receivers. More particularly, a pointing, acquisition and tracking (PAT) procedure is often used to point a laser beam to a ground terminal receiver. PAT procedures are complicated, and require moving parts such as fast steering mirrors or gimbals, vibration isolation platforms, and a significant power budget. In accordance with the disclosure, such systems are not required.

More particularly, system 100 can compensate for such movement. As a wavering inbound beam 200 moves from illuminating a given photodetector 192 or set of associated photodetectors 192, it can be detected by an adjacent set of photodetectors 192, and a laser 194 associated with the adjacent set of photodetectors 192 can resume transmitting the interrupted data stream.

FIG. 5 further illustrates two inbound beams 200, and two returning encoded beams 202. In accordance with the disclosure, any number of subassemblies 190 can be used to each generate an independent communication link to either a common or different source objects. Likewise, a plurality of subassemblies 190 can be coordinated to produce separate data streams which are combined at the destination to generate one correspondingly larger set of common data, for example using wavelength division multiplexing. In this manner, the overall bandwidth of system 100 can be greatly increased. Such combined signals can be established with multiple targets. In this manner, system 100 can operate as a relay, for example between the Earth, LEO objects, GEO objects, objects in deep space, and/or other astronomical objects, such as planets, moons, or asteroids.

Figures 6, 7:
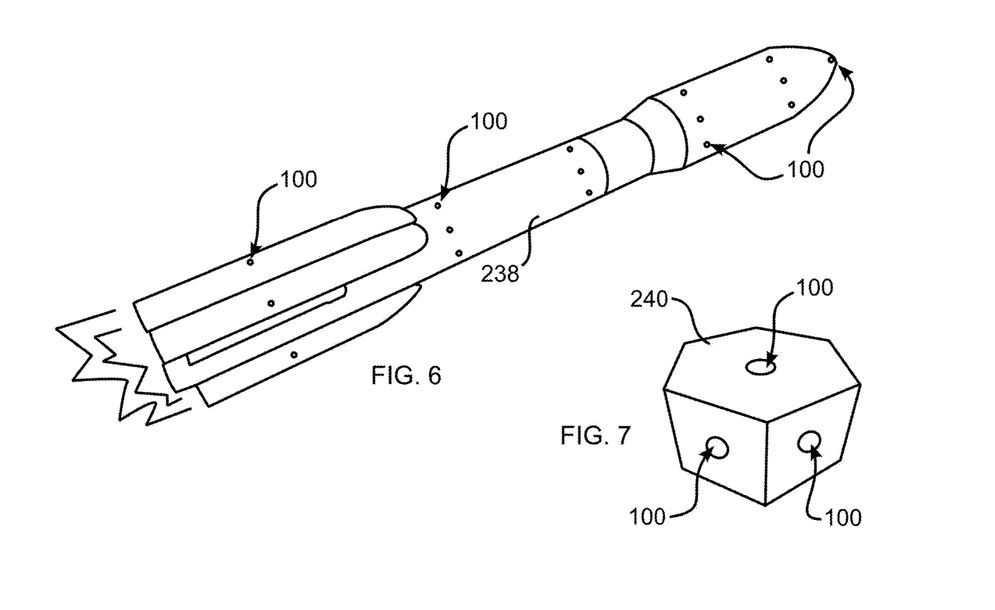
FIG. 6 depicts a plurality of systems 100 of the disclosure positioned about an external surface of a launch vehicle.
FIG. 7 depicts a plurality of systems 100 of the disclosure positioned about an external surface of a satellite.

In FIG. 6, in place of, or in addition to, radio frequency communication methods, one or more systems 100 can be positioned about an exterior surface of a rocket or launch vehicle 238. If sufficient systems 100 are deployed, it can be possible to maintain communication with another object in the unlikely event of unplanned or uncontrolled movement of vehicle 238 during its flight. A system 100 can be placed in a minimum of locations about an exterior of a vehicle 240, or other object, so that regardless of an orientation of the object, a line of sight may be established with a particular source location. Determining the number of systems 100 can include consideration of the maximum angle of inbound beams relative to an axis of device 150 at which optical device 150 can bundle inbound beams onto the focal plane 180.

In FIG. 7, multiple systems 100 are illustrated disposed about an exterior surface of a multifaceted satellite 240. In this manner, satellite 240 can relay communication to multiple targets simultaneously using multiple systems 100, without requiring reorientation of satellite 240. Additionally, in a similar manner to FIG. 6, if such a satellite should be caused to tumble or otherwise dispose any one system 100 out of alignment with a source signal 200, another system 100 will become aligned, and may resume communications. During such tumbling, it can be determined which system 100 will become aligned next, due to the transmission of data which encodes the progressive identities of subassemblies 190 which are activated, each of which has a known location upon the satellite 240.

In an embodiment of the disclosure, an inbound laser beam 200 can function either as a beacon beam, to correlate with a returning beam 202 as described elsewhere herein, or can function to encode data, as well. Data can be encoded in any known manner, including modulation of beam strength. The photodetectors 192 would register the modulation of the beam strength and an electronic processor 1105 connected to the photodetectors 192 can be programmed to decode the signal.

The disclosure provides a system 100 of significant reliability, as the optical device 150, photodetectors 192, and lasers 194 all operate without moving parts. Further these components do not normally require maintenance. The disclosure provides an additional advantage, in that an inbound laser beam does not have to be sufficiently strong to reflect a signal back to the source, as is required when using prior art retro-reflectors, which can require beams in the kilowatt range. Moreover, these high powered beams typically operate at a wavelength of 1064 nm, which can damage human eyes, and which is not a standard communication wavelength that is widely adopted. Still further, these beams are sufficiently powerful to subject the returning reflected beam to atmospheric backscatter from the forward beam, reducing signal quality. As the disclosure provides its own separate returning beam, a substantially weaker inbound beam can be used, and problems of backscatter can be avoided.

The disclosure can improve systems that only use a spacecraft ADCS (attitude determination and control system) for beam pointing, providing more accurate beam pointing and saving power, while avoiding interruptions in the mission. The disclosure can also improve beaconless systems, for example of the type which use star tracking as part of an ADCS pointing system, instead of a beacon laser beam from a ground terminal.

The divergence of outbound beam 202 can be changed by changing a diameter of a lens system in optical device 150. The accuracy of the direction of the outgoing beam can be determined, for example, by the particular design of a lens system within device 150. An increased, or more fine resolution of detection can be obtained by increasing the size of a lens system within optical device 150 in combination with an appropriate design of the detector/laser panel 186, including, for example, the layout of the wafer and the size of photodiode pixels. For Low Earth Orbit applications, a power output on the order of one mW is expected to be sufficient for a VCSEL in a subassembly 190.

A system of the disclosure does not pose any serious electrical safety issues, as microelectronic components are used that operate at voltages below 10V, and with currents below 100 mA. The laser radiation received at the ground terminal will not pose a danger to human health because of the low transmitted power. In addition, VCSELs can be used for laser 194 which can operate in the 1550 nm wavelength range, where the maximum permitted exposure level for the eyes is orders of magnitudes higher than at other wavelengths. This simplifies testing of the devices on the ground.

Example Computer System

Figure 8:
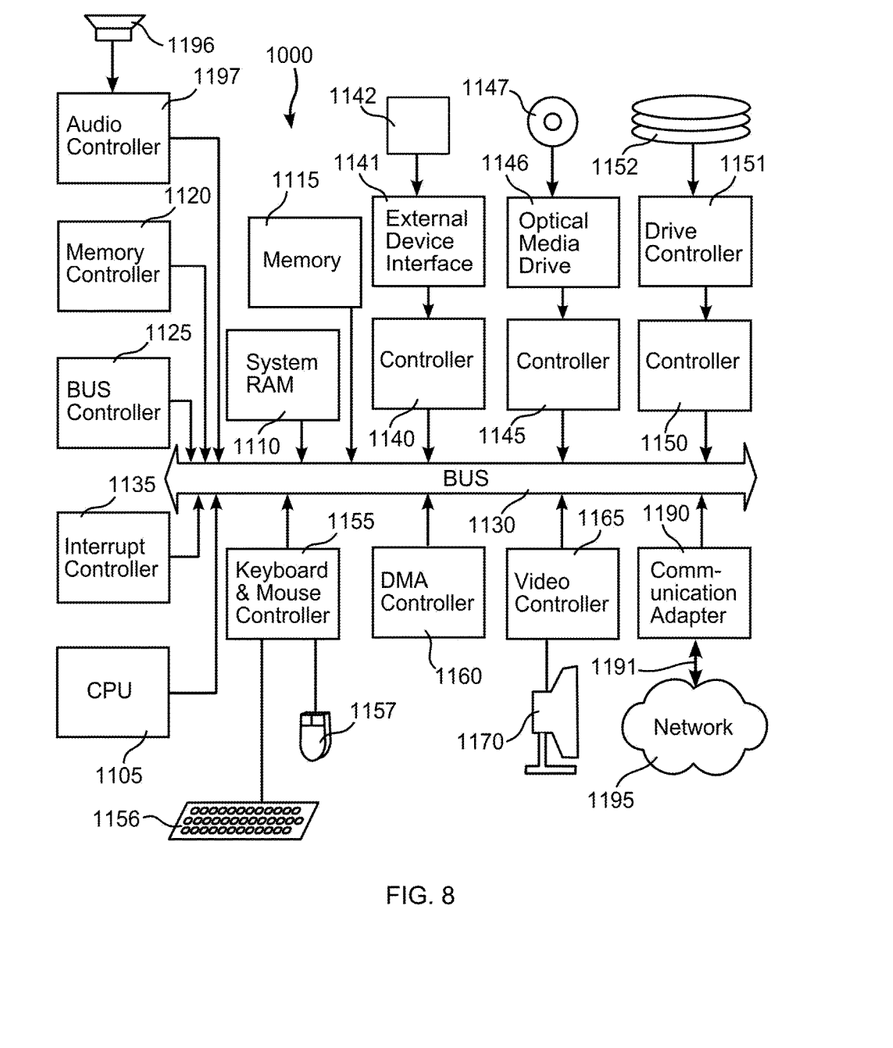
FIG. 8 depicts an example computer system, some or all of which can be used to carry out various aspects of the disclosure.

FIG. 8 illustrates a system architecture for a computer system 1000 which can process data at a ground station, or within an orbiting or space based object, in accordance with the disclosure. All or only portions of such system can be used, as needed. The exemplary computer system of FIG. 8 is for descriptive purposes only. Although the description may refer to terms commonly used in describing particular computer systems, the description and concepts equally apply to other systems, including systems having architectures dissimilar to FIG. 8. System 1000 can be an embedded system.

Computer system 1000 includes at least one central processing unit (CPU) 1105, or server, which may be implemented with a conventional microprocessor, a random access memory (RAM) 1110 for temporary storage of information, and a read only memory (ROM) 1115 for permanent storage of information. A memory controller 1120 is provided for controlling RAM 1110.

A bus 1130 interconnects the components of computer system 1000. A bus controller 1125 is provided for controlling bus 1130. An interrupt controller 1135 is used for receiving and processing various interrupt signals from the system components.

Mass storage may be provided by diskette 1142, CD or DVD ROM 1147, flash or rotating hard disk drive 1152. Data and software may be exchanged with computer system 1000 via removable media such as diskette 1142 and CD ROM 1147. Diskette 1142 is insertable into diskette drive 1141 which is, in turn, connected to bus 1030 by a controller 1140. Similarly, CD ROM 1147 is insertable into CD ROM drive 1146 which is, in turn, connected to bus 1130 by controller 1145. Hard disk 1152 is part of a fixed disk drive 1151 which is connected to bus 1130 by controller 1150. It should be understood that other storage, peripheral, and computer processing means may be developed in the future, which may advantageously be used with the disclosure.

User input to computer system 1000 may be provided by a number of devices. For example, a keyboard 1156 and mouse 1157 are connected to bus 1130 by controller 1155. An audio transducer 1196, which may act as both a microphone and a speaker, is connected to bus 1130 by audio controller 1197, as illustrated. It will be obvious to those reasonably skilled in the art that other input devices, such as a pen and/or tablet, Personal Digital Assistant (PDA), mobile/cellular phone and other devices, may be connected to bus 1130 and an appropriate controller and software, as required. DMA controller 1160 is provided for performing direct memory access to RAM 1110. A visual display is generated by video controller 1165 which controls video display 1170. Computer system 1000 also includes a communications adapter 1190 which allows the system to be interconnected to a local area network (LAN) or a wide area network (WAN), schematically illustrated by bus 1191 and network 1195.

Operation of computer system 1000 is generally controlled and coordinated by operating system software, such as UNIX, or a Windows system, commercially available from Microsoft Corp., Redmond, Wash. The operating system controls allocation of system resources and performs tasks such as processing scheduling, memory management, networking, and I/O services, among other things. In particular, an operating system resident in system memory and running on CPU 1105 coordinates the operation of the other elements of computer system 1000. The present disclosure may be implemented with any number of commercially available operating systems, including supercomputers and massively parallel processing systems.

One or more applications, such as an HTML page server, or a commercially available communication application, may execute under the control of the operating system, operable to convey information to a user.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

The invention claimed is:

1. A method of communicating, comprising:
   receiving laser light beams in a lens, the lens attached to a device positioned upon an object in Space located at least as far from Earth as LEO, at any of a plurality of angles, and to output the light beams upon a focal plane of the lens, the position of the light beams upon the plane corresponding to the angle of the beam received, the device further including
      a plurality of lasers distributed upon a supporting surface connected to the lens to be positioned along the focal plane, the plurality of lasers thereby distributed along the focal plane, and
      a plurality of photodetectors distributed upon the supporting surface to position individual photodetectors proximate individual lasers, the photodetectors configured to detect the received light beams upon the focal plane;
   using a processor to
      receive a signal from individual ones of the plurality of photodetectors corresponding to light beams detected,
      selectively signal individual ones of the plurality of lasers positioned proximate the individual ones of the photodetectors detecting light, the signal operative to cause the selected lasers to transmit light encoding data;

receiving the light encoding data and outputting the light encoding data with the lens from Space in a direction of the Earth at an angle corresponding to a location upon the focal plane of the individual ones of the plurality of lasers transmitting the light encoding data.

2. The method of claim 1, wherein individual ones of the plurality of lasers are VCSEL type lasers.

3. The method of claim 1, wherein the lens is a telecentric lens.

4. The method of claim 1, further including multiplexing the light encoding data emitted from a plurality of selected lasers to form a common data stream.

5. The method of claim 4, wherein the multiplexing is wavelength division multiplexing.

6. The method of claim 1, further including encoding the light encoded data at a rate of more than about 1 GHz.

7. The method of claim 1, wherein the object the device is positioned upon is a satellite.

8. The method of claim 1, wherein the device of claim 1 is a first device, and further including positioning a second of the device upon the object, the lens of the second device facing in a different direction than the first device.

9. The method of claim 8, the second device is electrically connected to the first device to exchange data with the first device, the method further including positioning the second device upon the object to transmit and receive light encoding data in a direction away from Earth.

10. The method of claim 1, wherein the photodetectors and the lasers are provided in the form of a manufactured wafer.

11. The method of claim 1, wherein there are more than 100 photodetectors, and more than 100 lasers.

12. The method of claim 1, further including positioning a plurality of the device of claim 1 upon the object, the plurality of devices oriented with respect to each other to face the respective lenses of the plurality of devices in relatively different directions.

13. A communication system positionable upon a flying object, comprising:
　a plurality of devices each including:
　　a lens configured to receive laser light beams at any of a plurality of angles, and to output the light beams upon a focal plane of the lens, the position of the light beams upon the plane corresponding to the angle of the beam received,
　　a plurality of lasers distributed upon a supporting surface connected to the lens to be positioned along the focal plane, the plurality of lasers thereby distributed along the focal plane; and
　　a plurality of photodetectors distributed upon the supporting surface to position individual photodetectors proximate individual lasers, the photodetectors configured to detect the received light beams upon the focal plane;
　each of the plurality of devices connected to a processor configured to
　　receive a signal from individual ones of the plurality of photodetectors corresponding to light beams detected,
　　selectively signal individual ones of the plurality of lasers positioned proximate the individual ones of the photodetectors detecting light, the signal operative to cause the selected lasers to transmit light encoding data; and
　the lens further configured to receive the light encoding data and to output the light encoding data at an angle corresponding to a location upon the focal plane of the individual ones of the plurality of lasers transmitting the light encoding data;
　the plurality of devices oriented with respect to each other to face the respective lenses of the plurality of devices facing in relatively different directions.

14. The system of claim 13, wherein the lens is configured to receive laser light beams transmitted from the Earth to Space.

15. The system of claim 13, wherein the flying object is a satellite, and the plurality of devices are distributed about a periphery of the satellite.

16. The system of claim 13, wherein the flying object is a rocket, and the plurality of devices are distributed about a periphery of the rocket.

17. The system of claim 13, wherein individual ones of the plurality of lasers are VCSEL type lasers.

18. The system of claim 13, wherein the light encoding data emitted from a plurality of selected lasers encodes data that is multiplexed to form a common data stream.

19. A method for communicating between the Earth and an object in Space, comprising:
　transmitting first laser light encoding data from Earth to a device mounted upon a flying object in Space at a distance at least as far from Earth as LEO;
　receiving the first laser light through a lens, mounted to the device, at any of a plurality of angles, and to output the first laser light upon a focal plane of the lens, the position of the outputted first laser light upon the plane corresponding to the angle of the first laser light when received;
　detecting the outputted first laser light by at least one of a plurality of photodetectors distributed upon a supporting surface connected to the lens to be positioned along the focal plane, individual ones of the plurality of photodetectors positioned proximate individual ones of a plurality of lasers distributed upon the supporting surface;
　using a processor to
　　receive a signal from individual ones of the plurality of photodetectors corresponding to the outputted first laser light detected,
　　selectively signal individual ones of the plurality of lasers positioned proximate the individual ones of the photodetectors detecting light, the signal operative to cause the selected lasers to transmit light encoding data; and
　transmitting the light encoding data using the lens to output the light encoding data from Space toward Earth at an angle corresponding to a location upon the focal plane of the individual ones of the plurality of lasers transmitting the light encoding data.

20. The method of claim 19, further including positioning a plurality of the devices about a periphery of the flying object.

* * * * *